(12) United States Patent
Schulte

(10) Patent No.: US 11,890,629 B2
(45) Date of Patent: Feb. 6, 2024

(54) AGRICULTURAL SPRAYER VALVE UNIT AND AGRICULTURAL SPRAYER VALVE DEVICE

(71) Applicant: Reinhold Schulte, Paderborn (DE)

(72) Inventor: Reinhold Schulte, Paderborn (DE)

(*) Notice: Subject to any disclaimer, the term of this patent is extended or adjusted under 35 U.S.C. 154(b) by 557 days.

(21) Appl. No.: 17/176,974

(22) Filed: Feb. 16, 2021

(65) Prior Publication Data
US 2021/0162443 A1    Jun. 3, 2021

Related U.S. Application Data

(63) Continuation of application No. PCT/EP2019/071573, filed on Aug. 12, 2019.

(30) Foreign Application Priority Data

Aug. 17, 2018    (EP) .................................... 18189451

(51) Int. Cl.
| | |
|---|---|
| *F16K 17/04* | (2006.01) |
| *F16K 31/06* | (2006.01) |
| *B05B 12/02* | (2006.01) |
| *B05B 12/08* | (2006.01) |
| *B05B 1/20* | (2006.01) |
| *B05B 12/00* | (2018.01) |
| *G05D 7/00* | (2006.01) |

(52) U.S. Cl.
CPC ............... *B05B 12/087* (2013.01); *B05B 1/20* (2013.01); *B05B 12/004* (2013.01); *B05B 12/02* (2013.01); *F16K 17/048* (2013.01); *F16K 31/06* (2013.01); *F16K 31/0655* (2013.01); *G05D 7/005* (2013.01)

(58) Field of Classification Search
CPC ....... B05B 12/087; B05B 1/20; B05B 12/004; B05B 12/02; F16K 17/048; F16K 31/06; F16K 31/0655; G05D 7/005
See application file for complete search history.

(56) References Cited

U.S. PATENT DOCUMENTS

| | | | |
|---|---|---|---|
| 4,753,212 A | 6/1988 | Miyaki | |
| 5,450,881 A * | 9/1995 | Patterson | ............. B67D 7/0238 141/50 |

(Continued)

FOREIGN PATENT DOCUMENTS

| | | |
|---|---|---|
| CN | 86102235 A | 7/1989 |
| CN | 2042140 U | 8/1989 |

(Continued)

OTHER PUBLICATIONS

Written Opinion of the International Searching Authority for PCT/EP2019/071573 dated Oct. 23, 2019.

*Primary Examiner* — Kevin R Barss
(74) *Attorney, Agent, or Firm* — The Sladkus Law Group

(57) ABSTRACT

The invention relates to an agricultural sprayer valve unit. An electronically controlled control valve and a passive overflow valve serially connected in fluid communication are arranged in the agricultural sprayer valve unit between a primary line and a secondary line. The agricultural sprayer valve unit may be used for any agricultural sprayer valve device, in particular in connection with the discharge of a fluid such as water, a fertilizer, an insecticide, a weedkiller and the like in agricultural or fruit or vegetable cultivation.

19 Claims, 9 Drawing Sheets

(56) References Cited

U.S. PATENT DOCUMENTS

| | | | | |
|---|---|---|---|---|
| 5,472,009 | A | * 12/1995 | Linderoth | G05D 7/0126 |
| | | | | 137/118.01 |
| 2006/0086823 | A1 | 4/2006 | Colarusso | |
| 2006/0273189 | A1 | 12/2006 | Grimm | |
| 2010/0072301 | A1 | 3/2010 | Cater | |
| 2011/0220736 | A1 | 9/2011 | Anderton | |
| 2016/0178422 | A1 | 6/2016 | Humpal | |

FOREIGN PATENT DOCUMENTS

| | | | |
|---|---|---|---|
| CN | 1762607 | A | 5/2006 |
| CN | 202834247 | U | 3/2013 |
| DE | 696 25 914 | T2 | 9/1995 |
| DE | 10 2009 001 532 | A1 | 8/2011 |
| DE | 10 2010 001 881 | A1 | 8/2011 |
| DE | 10 2011 000 921 | B3 | 7/2012 |
| DE | 10 2013 101 460 | B3 | 2/2013 |
| EP | D 847 307 | B1 | 6/1998 |
| EP | 2 165 770 | A1 | 3/2010 |
| EP | 2 227 949 | A1 | 3/2010 |
| EP | 2 227 949 | B9 | 3/2010 |
| EP | 2 979 765 | B1 | 1/2017 |
| EP | 2 227 949 | B9 | 5/2018 |
| ES | 2 528 933 | T3 | 2/2015 |
| GB | 2 196 878 | A | 5/1988 |
| GB | 2 337 984 | A | 8/1999 |
| JP | H1182220 | A | 3/1999 |
| KR | 101778076 | B1 | 9/2017 |
| SU | 1574160 | A3 | 6/1990 |
| WO | 2017/223252 | A1 | 12/2017 |
| WO | PCT/EP2019/071573 | | 2/2020 |

* cited by examiner

AGRICULTURAL SPRAYER VALVE UNIT AND AGRICULTURAL SPRAYER VALVE DEVICE

CROSS REFERENCE TO RELATED APPLICATIONS

This application is a continuation of International Application PCT/EP2019/071573 with an international filing date of Aug. 12, 2019 and claiming priority to European Patent Application No. EP 18 189 451.0 entitled "Agricultural Spraying Valve Unit and Agricultural Straying Valve Device", filed on Aug. 17, 2018.

FIELD OF THE INVENTION

The present invention relates to a valve unit for an agricultural sprayer (in the following "agricultural sprayer valve unit") and a valve device for an agricultural sprayer (in the following "agricultural sprayer valve device") comprising an agricultural sprayer valve unit of that type.

Agricultural sprayer valve units and agricultural sprayer valve devices serve for controlling (open-loop control or closed-loop control, both subsumed under "control" within the frame of the present invention) the output of a fluid by means of an agricultural sprayer of any construction and any intended use. An agricultural sprayer of that type e. g. serves for outputting a fluid in agriculture or fruit cultivation or vegetable cultivation, the fluid e. g. being water, a fertilizer, an insecticide, a herbicide or weedkiller or any other fluid or mixture of fluids.

BACKGROUND OF THE INVENTION

Agricultural sprayers can be used singularly for outputting an agricultural fluid to a limited area or with a plurality of agricultural sprayers which can e. g. be held one besides another on one or a plurality of spraying booms. In particular due to the costs as well as from ecological reasons the fluid should only be output in the actually relevant agricultural areas and here also only with the required volumetric flow. In order to mention only one example the output of the fluid should be stopped in the edge regions of the field (e. g. when driving through a curve) when a spraying vehicle moves over the field along a meandering path. It is also possible that agricultural sprayers associated with subsections of the spraying boom which do not pass plants or crop are temporarily switched off. For the complete stop in the edge region of a field one central agricultural sprayer valve unit arranged in a supply line to all of the agricultural sprayers can be transferred into a closed position. The deactivation of subsections of a spraying boom requires that a central line of the spraying boom to which the agricultural sprayers are connected is segmented into parallel segments that can be closed separately by agricultural sprayer valve units associated with each of the segments. Finally, it is also possible that the agricultural sprayer valve unit is (additional to a closed position and an open position) controlled into at least one intermediate position (in particular continuous intermediate positions) in order to be able to control the output according to the needs.

Problems and approaches for solving the problems related with modern agricultural sprayers can be taken from the publications DE 10 2009 001 532 A1 and DE 696 25 914 T2. According to these publications a change of an output rate with required intermediate positions of the agricultural sprayer valve unit might be of interest, the change depending on the intended agricultural use, on an expected drift of sprayed droplets due to the wind, on the velocity of the spraying vehicle, on the desired dimension of the spraying area of the agricultural sprayer, on the heights of the spraying boom above the ground, on a desired droplet size or on a desired spectrum of the droplet sizes, on the desired fluidic flow, on a desired angle of a spraying cone and the like. It is also possible that the output rate is controlled on the bases of information from a global positioning system wherein the volumetric flow of the output e. g. depends on the position on the field (e. g. on the basis of the last harvesting and related with the position).

It is also known to change a volumetric flow of the output of the agricultural fluid by a control of the supply capacity of a pump supplying the fluid, by a control of the pressure in a supply line, by a change of an opening cross section of an agricultural sprayer valve unit or by use of an agricultural sprayer valve unit embodied as a pulse-modulated system (cp. DE 10 2009 001 532 A1 and DE 696 25 914 T2) wherein in the last-mentioned case the volumetric flow averaged over time can be varied by the so-called "Duty Cycle" and the ratio of the short opening times of the valve and the closing times of the valve. There is also an interdependence of the output between the agricultural sprayer valve unit and the spraying unit or nozzle unit arranged downstream from the agricultural sprayer valve unit from which the fluid exits towards the ground or towards the crop or harvesting good which is to be moistened with the fluid.

Agricultural sprayer valve units can be embodied as directly controlled solenoid valves wherein a valve body being a valve disc contacting a valve seat in a closed position is directly mechanically connected to an electromagnetic actuator. Here, the electromagnetic actuator comprises a coil and an armature moved within the coil, the movable armature being coupled to the valve body. The electromagnetic actuator has to generate an opening force which depends on the dimension of the valve disc as well as the pressure difference between a primary line and a secondary line of the agricultural sprayer valve unit (cp. DE 10 2013 101 460 B3).

DE 10 2011 000 921 B3 discloses an agricultural sprayer valve unit which is embodied as a passive overflow valve without electronic control options. Here, the size and geometry of a transfer cross section between the primary line and the secondary line depends on the position of a valve body. In this case, the valve body is formed by a balancing piston. The balancing piston comprises a first piston surface which is permanently biased by the pressure in the primary line. Furthermore, the balancing piston comprises a second piston surface which is directed opposite to the first piston surface and permanently biased by the pressure in the secondary line. Accordingly, the position of the valve body and the size and geometry of the transfer cross section depends on the pressure difference in the primary line and the secondary line. For the start of the operation of an agricultural sprayer there is no pressure in the secondary line so that a pressure increase in the primary line leads to a fast opening of the agricultural sprayer valve unit. If there is an undesired clogging during the operation of the agricultural sprayer at a location upstream from the agricultural sprayer valve unit, the fluid is blocked in the secondary line so that the difference of the pressure biasing the second piston surface and the pressure in the primary line which biases the first piston surface becomes smaller or zero. If there is a clogging it is in this way possible to automatically close the overflow valve in order to avoid a further transfer of fluid from the primary line to the secondary line.

EP 2 227 949 A1 discloses the general design of a field sprayer system with the whole fluidic circuit and the arrangement of a plurality of agricultural sprayer valve units on a spraying boom. Here, agricultural sprayer valve units are used wherein the movement of a valve body is controlled by use of a pulse-width modulation.

EP 2 979 765 B1 discloses an agricultural sprayer valve unit wherein a valve is arranged between a primary line and a secondary line. The valve comprises a valve body and a valve seat. In the open position of the valve the valve body and the valve seat provide a transfer cross section between the primary line and the secondary line. The valve body is biased by a spring towards a closed position and towards the valve seat. The pressure in the primary line biases the valve body in opening direction. The valve forms an overflow valve because when the pressure in the primary line exceeds a threshold the valve body is moved away from the valve seat. Accordingly, the valve is only opened when with the start of the operation of a pump the threshold of the pressure is reached. Additional to the passive overflow function of the valve it is possible to hold the valve body by a holding magnet in the closed position. Here, a holding magnet is subsumed to be an electromagnet wherein there is no mechanical transmission of the movement. Instead, the electric holding magnet comprises a coil winding and a core which cannot be moved relative to the coil winding. In the guideline VDE 0580 holding magnets of this type are also denoted as "lifting magnets" or "load magnet" (German: "Lasthebemagnet"). Here, a holding magnet is used which is embodied as a pot magnet being rotationally symmetric. The holding of the valve by the holding magnet is possible with a drastic reduction of the power consumption when compared to an electromagnet with an interior moveable armature. However, in some cases it is nevertheless possible to induce great holding forces. In the case that the holding magnet holds the valve body in the closed position it is possible that the overflow function can be deactivated by the holding magnet so that the valve maintains the closed position even though the threshold of the pressure in the primary line is exceeded. This principle can e. g. be used for inducing the deactivation of segments of a spraying boom by energizing single holding magnets of a plurality of agricultural sprayer valve units or for temporarily stopping the output for the entire spraying boom (e. g. when driving through a curve at the edge region of the field) by energizing all of the holding magnets of the agricultural sprayer valve units. Alternatively, the publication proposes that the holding magnet secures the open position of the valve body. In this case, it is also possible to trigger the overflow function by energizing the holding magnet even when the pressure difference between the pressures in the primary line and the secondary line is not sufficient for transferring the valve into the open position. If the holding magnet cooperates with the armature which is coupled to the valve body, the magnetic conductivity, the magnetic resistance and the flow density change dependent on the position of the valve body and so dependent on the distance of the armature from the holding magnet. When biasing the holding magnet with an alternating voltage or an alternating current the current curves, the voltage, the impedance and/or a phase shift of the electric bias of the holding magnet change. So, a distance of the armature from the holding magnet can be calculated from a change on the basis of the physical conditions or by use of a characteristic map. In this way a kind of sensor for the operating position of the valve body and so for the operating position of the valve can be provided. Here, the sensor might generate a binary signal (open/closed), a digital signal or an analog signal for the distance of the armature from the holding magnet. On the basis of the processing of the distance of the armature from the holding magnet determined in this way it is then possible to detect a defective operational state of the agricultural sprayer for which the valve is used. It is e. g. possible that a break-in of the pressure in the primary line (in particular due to a malfunction of a pump or a leakage in an input line) is detected. It is also possible that the sensor detects a clogging in the agricultural sprayer (in particular in the region of the secondary line or in the region of a spraying nozzle or output nozzle). It is also possible that a blocking of a movement of the valve body (e. g. due to wear or a foreign material in the guiding section of the valve body or between the valve seat and the valve body) can be detected. Furthermore EP 2 979 765 B1 proposes to generate a non-stationary electric test signal which biases the holding magnet. Here, the test signal is defined by the control unit in a way such that the best possible measurement of the distance of the armature from the holding magnet is possible. It is e. g. possible to apply this electric test signal in the holding position of the armature wherein the armature is already held with a comparatively great holding force by the holding magnet. Accordingly, a small oscillating force due to the electric test signal does not lead to the result that the armature moves away from the holding magnet. It is also possible that the test signal is super-imposed on the electric biasing signal of the holding magnet used otherwise. Here, the amplitude of the electric test signal is smaller than the amplitude of the electric biasing signal. For an alternative or cumulative embodiment it is proposed that the test signal has a frequency such that the test signal indeed causes a flow through the holding magnet and the armature which depends on the distance of the armature from the holding magnet. However, due to the inertia of the armature and of the valve body the valve is not able to induce a significant change or oscillation of the position of the valve body caused by the high-frequent test signal and the high-frequent force of the holding magnet induced in this way.

SUMMARY OF THE INVENTION

The invention proposes an agricultural sprayer valve unit and an agricultural sprayer valve device which is in particular improved with respect to
  the operational safety,
  a drip-protection,
  the option of detecting a clogging and/or
  a sensing of the flow rate.

Features and advantages of the present invention will become apparent to one with skill in the art upon examination of the following drawings and the detailed description. It is intended that all such additional features and advantages be included herein within the scope of the present invention, as defined by the claims.

The invention relates to an agricultural sprayer valve unit wherein a primary line and a secondary line are connected to each other by an electronically controlled control valve. It is possible that in the electronically controlled control valve one valve position (in particular an open position or a closed position) can be upheld and/or changed by a holding magnet.

According to the invention (additional to the electronically controlled control valve) an overflow valve is arranged in the agricultural sprayer valve unit. Here, the overflow valve is a passive overflow valve so that it is not possible to change the valve position by an electronic energization and/or the valve position of the overflow valve only depends on the effective fluidic pressures and any springs biasing the overflow valve.

The electronically controlled control valve and the passive overflow valve are arranged in a series connection between the primary line and the secondary line. Accordingly, the flow from the primary line to the secondary line both depends on the position of the electronically controlled control valve as well as on the position of the passive overflow valve. Here, the passive overflow valve might be arranged downstream or upstream from the electronically controlled control valve.

Accordingly, according to the invention the functions can be controlled on the one hand by the electronic control provided by use of the electronically controlled control valve and on the other hand by means of the overflow function provided by the passive overflow valve. Accordingly, by the design on the one hand of the control valve and on the other hand of the overflow valve it is possible to specifically consider the respective demands without mutual dependencies being present. It is in particular possible that the threshold of the pressure in the primary line leading to a passive opening of the overflow valve can be defined independent on the design of the control valve. In a reliable way the passive overflow valve guaranties that before reaching the threshold for the opening of the overflow valve fluid is able to flow through the agricultural sprayer valve unit which in a very reliable way provides the drip protection. The overflow valve is preferably embodied as an overflow valve which does not allow any backward flow and/or which allows a flow from the primary line towards the secondary line. Here, any constructive design of the overflow valve can be used. In order to mention only some non-limiting examples, the overflow valve might be embodied as a check valve with a spring-biased check valve body for defining the opening pressure, might be embodied as a seated valve or might be embodied as a membrane valve and the like.

It is generally possible that the electronically controlled control valve takes its closed position without any electric bias of the holding magnet. For another embodiment without any electric bias of the holding magnet the electronically controlled control valve takes its open position. This was not possible for the embodiments known from the prior art because in this case the prior art embodiments could not provide a drip protection when there is no electric bias of the holding magnet (as e. g. in the case of a failure of the electric power supply). For the inventive design dripping or a leakage can at least be reduced when the electronically controlled control valve takes its open position without any electric bias of the holding magnet. The reason for this is that (e. g. in the case of a failure of the electric power supply) indeed the control valve takes its open position. However, in this case the flow through the agricultural sprayer valve unit is blocked because the passive overflow valve takes its closed position.

The overflow valve used within the frame of the invention might have any opening characteristic and might comprise a hysteresis or not. For another proposal of the invention in a closed position of the overflow valve the pressure in the primary line biases a smaller valve area than in the open position of the overflow valve. Said in different words, in the closed position of the overflow valve a smaller opening force biases the valve body of the overflow valve than in the open position of the overflow valve if there is the same pressure in the primary line. As a consequence when the opening pressure in the primary line is exceeded for the first time the overflow valve is opened. Nevertheless, for a temporary small pressure drop in the primary line (which might also be caused by the opening of the overflow valve). the open position of the overflow valve is upheld due to the increasing effective valve area.

Within the frame of the invention it is possible that the electronically controlled control valve comprises a valve body of the control valve (in the following "control valve valve body") whereas the overflow valve comprises a valve body of the overflow valve (in the following "overflow valve valve body"). It is generally possible that the control valve valve body and the overflow valve valve body interact with different valve seat bodies. For a very compact design the invention proposes to use a common valve seat body. This common valve seat body then on the one hand forms the control valve valve seat of the electronically controlled control valve which is contacted by the control valve valve body in the closed position of the electronically controlled control valve. On the other hand the common valve seat body then forms the overflow valve valve seat of the overflow valve which is contacted by the overflow valve valve body in the closed position of the overflow valve.

Within the frame of the invention there are any and a lot of options for the constructive design and arrangement of the overflow valve and the electronically controlled control valve. For one proposal the agricultural sprayer valve unit might be very compact by nesting the overflow valve and the electronically controlled control valve in radial direction into each other. Here, the electronically controlled control valve might be arranged radially outside from the overflow valve. However, for a particularly proposal of the invention the overflow valve is arranged radially outside from the electronically controlled control valve.

Here, for one proposal of the invention it is possible that the overflow valve comprises an overflow valve valve body having a through recess. In order to mention only a non-limiting example, the overflow valve valve body might e. g. have a sleeve-like design with any semi-longitudinal section. In this case a channel between the overflow valve and the electronically controlled valve and/or a component of the electronically controlled valve might at least partially extent trough the through recess. It is e. g. possible that a stem of the control valve valve body and/or a guiding body and/or sealing body for the same is arranged in the through recess or at least partially extends through the same.

The invention also covers embodiments wherein the agricultural sprayer valve unit comprises a housing which in an additional function also forms a component of the overflow valve and/or the control valve. However, within the frame of the invention it is also possible that the housing does not contribute to the design of the control valve and the overflow valve, but only serves for accommodating, holding and/or supporting the same. The invention also proposes that the housing comprises an inner chamber. Here, the housing might have a one-piece design or multi-piece design. The overflow valve valve body, the control valve valve body and/or at least one valve seat body can then be formed separately from the housing and can be arranged within the housing (removable and ready for being disassembled) where these can then be supported, held and/or guided by the housing.

Another solution of the object of the invention is provided by an agricultural sprayer valve device which comprises (at least one or) an agricultural sprayer valve unit as described above. Here, the agricultural sprayer valve device might comprise only the agricultural sprayer valve unit or might comprise additional components as e. g. at least
   one control unit, at least one input and/or output line connected to the primary line and/or the secondary line one agriculturally output nozzle for outputting the fluid, one line system or circuit for the supply of fluid which is to be output, one spraying boom, one pump and valves being fluidically and/or electronically controlled and being arranged in the aforementioned circuit, one reservoir for providing the fluid which is to be output and the like.

In the agricultural sprayer valve device a control unit is provided. This might be a control unit specifically associated with the agricultural sprayer valve unit, the control unit being a component of the agricultural sprayer valve unit, the control unit being held by the agricultural sprayer valve unit (e. g. flanged to the agricultural sprayer valve unit or arranged externally from the same) or the control unit communicating with the agricultural sprayer valve unit via a control line or a bus system. In this case, the control unit comprises control logic which determines at least one parameter from the electric bias of the holding magnet (in particular from an absolute value or a curve of a current and/or a voltage). This covers the determination of one single parameter (e. g. at specific points in time as after given time spans or for predetermined operational points or for changes of the type of operation, as e. g. the change of a duty factor of the pulse-width modulation) or the determination of a number of parameters or even a parameter curve. The parameter correlates with or equals a flow rate through (and/or an extent of a clogging of) the agricultural sprayer valve unit, the secondary line, a connecting line between the agricultural sprayer valve unit and the output nozzle and/or and the output nozzle. If the parameter is a flow rate, the parameter can be considered for controlling the output of the agricultural sprayer valve unit. In the case that the parameter correlates with the extent of a clogging it is possible to monitor a malfunction and it is possible to trigger counteractions for compensating an actual output differing from the desired output due to the clogging. It is also possible that a failure entry is made or a failure information is given to a user as the driver of the tractor that there is a clogging. It is also possible that an indication for a required cleaning or a special operation for an automated removal of the clogging is given. Here, the parameter of the clogging can be processed and signalized as a binary signal for the clogging ("clogging", "no clogging") or the extent of the clogging can be processed, sensed and/or signalized in a plurality of steps or also in a stepless fashion.

The control logic of the control unit is preferably designed such that the holding magnet is electrically biased with a pulse-width modulation. Here, the electric biasing signal is defined or controlled by the control unit. It is possible that the characteristic curve for the flow rate or for the extent of the clogging is determined on the basis of the electric bias. This embodiment bases on the finding that independent on the setting by the control unit the electric bias of the holding magnet depends on the position of the armature and the movement of the same. If accordingly the position of the armature or the movement of the armature changes due to a changed flow rate or a changed extent of the clogging, this can be detected on the basis of the electric bias of the holding magnet. To mention only one example (which is not intended to limit the invention) an induced voltage in the coil might depend on the position and/or the movement of the armature.

For the way of processing the signal of the electric bias of the holding magnet (in particular of the current or the voltage) there are a lot of options within the frame of the invention. Here, all known methods for signal processing and signal analysis can be used. To mention only some examples, it is possible that during one period of the pulse-width modulation, over a plurality of periods of the pulse-width modulation or also only for a part of a period of the pulse-width modulation an averaged value, an absolute or relative maximum value, an absolute or relative minimum value, an inclination, a turning point, a frequency spectrum or single values of the frequency spectrum of a FFT (Fast Fourier Transformation), an autocorrelation function and/or a distance in time of representative values as zero crossings, of maxima or minima is determined and considered for determining the parameter.

Another proposal of the invention bases on the finding that in some cases an electric bias in different phases of the Duty-Cycle of the pulse-width modulation might be more or less indicative for the parameter. It is e. g. possible that it is advantageous when the parameter is determined on the basis of the electric bias (also or exclusively) during the OFF-phase of the pulse-width modulation or the closing movement of the electronically controlled control valve. Without a limitation of the invention to the following tentative explanation of the reason being intended, it is assumed that in the case of a reduction of the flow rate and in particular in the case of a clogging in the primary line or upstream from the same the control valve valve body is biased by different fluidic conditions on the primary side and the secondary side. Accordingly, when there is a clogging it is e. g. possible that the pressure biasing the secondary side of the control valve valve body increases. Without any clogging of the primary line (with any throttling effect e. g. in the region of an output nozzle) a fluidic output chamber is formed which is open towards the environment. Instead, a clogging on the secondary side leads to an at least partial closure of the output chamber, a change of the throttling effect of the fluid on the secondary side and in some cases also to changed dynamic pressure oscillations of the fluid on the secondary side. These changed fluidic conditions of the control valve valve body (which depend on the flow rate and the clogging) then lead to a change of the current or the voltage during the OFF-phase of the pulse-width modulation or during the closing movement of the electronically controlled control valve which can be considered for determining the parameter.

However, it is also possible that the parameter is determined on the basis of the electric bias (also or exclusively) during the ON-phase of the pulse-width modulation or during the opening movement of the electronically controlled control valve. Furthermore, it is possible that the parameter is on the one hand determined on a parameter component determined during the OFF-phase or the closing movement as well as on the basis of a parameter component determined during the ON-phase or the opening movement.

For the way of processing the parameter there are a lot of options within the frame of the invention. In the following only two alternative or cumulative options are mentioned:

It is possible that the control logic is designed such that the parameter is determined from a local maximum of the electric bias (so the current or the voltage) during the OFF-phase of the pulse-width modulation or the closing movement of the electronically controlled control valve. It has surprisingly shown that during the closing movement of the electronically controlled control valve a change of the flow rate and/or of the extent of the clogging a local maximum of this type changes its position and/or its absolute value which allows a simple and at the same time reliable determination of the parameter.

It is also possible that the parameter is determined for a plurality of cycles of the pulse-width modulation. A change of the parameter then indicates a change of the flow rate and/or of an extent of a clogging. This change can then only be evaluated in a qualitative fashion ("there is a change of the flow rate" or "there is a change of the clogging" or "there is no change") or also in a quantitative fashion by using the extent of the change of the parameter (in some cases under consideration of a linear or non-linear dependency or characteristic map) as an indicator of the extent of the change of the flow rate and/or an extent of a clogging. Here, the parameter might also depend on other operational parameters that might also be considered for the evaluation (if applicable). Accordingly, it is e. g. possible that the parameter is determined under consideration of a dependency on the duty factor used for the pulse-width modulation. For an alternative or cumulative embodiment the parameter might also depend on the pressure provided on the input side in the primary line or a pressure in a fluidic supply circuit and so the evaluation might base on this dependency.

The invention also proposes an agricultural sprayer valve device comprising a plurality of agricultural sprayer valve units. A respective output nozzle is associated with each of the plurality of agricultural sprayer valve units. The agricultural sprayer valve units with the associated output nozzles are held on a spraying boom and are supplied with the fluid which is to be output by a pump. In this case, at least one electronic control unit is provided which controls at least one associated agricultural sprayer valve unit. Here, one central electronic control unit might be responsible for a plurality of or all of the agricultural sprayer valve units. It is also possible that de-centralized electronic control units are each associated with a respective agricultural sprayer valve unit. Finally, it is also possible that de-centralized control units are responsible for the associated agricultural sprayer valve units where one single central control unit is provided which coordinates the operation of the de-centralized control units and the associated agricultural sprayer valve units.

It is possible that in the agricultural sprayer valve device at least one or an agricultural sprayer valve unit is permanently in the open position so that when driving over a longer distance on a field (e. g. longer than 30 seconds, longer than 1 minute, longer than 2 minutes, longer than 5 minutes or even longer than 10 minutes) the fluid is continuously output with a desired volumetric flow. Here, it can be of interest to monitor if there is a change or degradation of the output behavior, in particular due to a clogging of the agricultural sprayer valve unit, of the secondary line and/or an output nozzle. The invention proposes that for testing the control logic of a control unit controls the control valve into a closed position (despite of the generally desired permanent operation of the agricultural sprayer valve unit in the open position). This might be done temporarily for a short time interval (in particular less than 100 milliseconds, less than 50 milliseconds or even less than 45 milliseconds) so that the percentage of the closing duration of the agricultural sprayer valve unit compared to the overall duration of the operation in the open position is very small and the effect of this closure on the field is minimized. It is possible that a temporary closure of the agricultural sprayer valve unit of this type is performed only once or a plurality of times for increasing the reliability of the test operation. It is also possible that a closure of this type is performed periodically (e. g. with a repetition after a time in the range of 30 seconds to 10 minutes or in the range of 1 minute to 5 minutes or in the range of 1 minute to 3 minutes; in order to mention only some examples which are not intended to limit the invention). By use of a test operation of this type with a transfer of the agricultural sprayer valve unit into the closed position (and subsequent reopening of the same) it is possible to obtain a test signal which can then be analyzed. This test signal is the electric bias of the holding magnet (in particular the current biasing the holding magnet) taking place during the transfer into the closed position and the subsequent return into the open position. At least one parameter is determined from this curve of the electric bias. The parameter at least correlates with a flow rate and/or an extent of a clogging of the agricultural sprayer valve unit, the secondary line and/or an output nozzle. However, it is not necessarily required to determine a parameter. Instead, it is also possible to determine the actual flow rate and/or an actual extent of a clogging by a different processing of the curve of the electric bias. In order to mention only one example (which is not intended to limit the invention) a drop of the current of the holding magnet, the occurrence of a turning point or a local maximum of the curve or the value of a maximum of this type might be taken as an indicator for the flow rate or the extent of a clogging.

However, it is also possible that the control valve is transferred into the closed position in a referencing operation. The referencing operation is in particular executed for a start-up, after a maintenance or in a state of the agricultural sprayer valve unit for which it is known that there is no clogging and the outputting behavior is according to the specifications. In the referencing operation the electric bias of the holding magnet is sensed. The electric bias is then used for the subsequent operation as a referencing bias so that a subsequently determined electric bias of the holding magnet can be compared to the referencing bias and this comparison can then be taken as an indicator for the extent of the clogging.

In the case that an agricultural sprayer valve device comprises a plurality of agricultural sprayer valve units which might e. g. be arranged with an offset on a spraying boom it is proposed that for testing purposes or referencing purposes the control valves of the agricultural sprayer valve unit are not transferred at the same time into their closing positions, but with an offset in time. It is e. g. possible that the agricultural sprayer valve units are each separately and with an offset in time controlled into the closed position. However, it is also possible that in a subgroup of the agricultural sprayer valve units the agricultural sprayer valve units of this subgroup are simultaneously controlled into the closed position. Then with an offset in time agricultural sprayer valve units of at least one other subgroup are controlled into the closed position. This embodiment in particular leads to the advantage that when executing the test operation during the drive over a field the output behavior is not effected at the same time and with an increased extent, but only locally and with an offset in time. It is also possible that due to the offset in time the occurrence of pressure oscillations in the fluidic supply system can be avoided or reduced.

For one proposal of the invention in a referencing operation the control logic of the control unit controls the control valve of one agricultural sprayer valve unit into a closed position. During this referencing operation then the electric bias (in particular the current) is sensed and this electric bias is then stored as the referencing bias. Here, a curve of the electric bias or the current can be sensed and stored. However, it is also possible that only a characteristic parameter of the electric bias is sensed or calculated from the electric bias and stored. Accordingly, it is e. g. possible that as a characteristic parameter a maximum, the point in time of the occurrence of the maximum, a turning point, a changing velocity and the like of the curve of the current is sensed, determined and/or stored. This referencing operation is executed at a point in time when it is assumed that there is the output behavior of the agricultural sprayer valve unit according to the specifications (e. g. for a first start-up, before driving over the field or after a maintenance). In a later test operation (e. g. during the use of the agricultural sprayer valve unit for outputting fluid on the field) then the control valve is (singularly, temporarily or also periodically) controlled into a closed position. In this case the extent of a clogging of the agricultural sprayer valve unit, of the secondary line and/or an output nozzle is determined by comparing the referencing bias with the electric bias sensed during the test operation. This embodiment is e. g. advantageous when in the fluidic chain for outputting the fluid by use of the agricultural sprayer valve unit there are manufacturing tolerances. These manufacturing tolerances might have the effect that the electric bias differs more or less for different agricultural sprayer valve units also without any clogging of the agricultural sprayer valve unit. If in this case for all of the agricultural sprayer valve units the same criteria would be used for evaluating the extent of the clogging, the manufacturing tolerances leaded to a reduction of the quality of the monitoring of the extent of the clogging. Accordingly, the above described method allows to make the determination of the extent of the clogging independent on the mentioned manufacturing tolerances. This method might be used for single agricultural sprayer valve units that are taken from a batch of a plurality of agricultural sprayer valve units, these agricultural sprayer valve units having manufacturing dimensional differences within manufacturing tolerances. However, it is also possible that a referencing operation of this type is successively executed for a plurality of agricultural sprayer valve units that are operated in common and then for each agricultural sprayer valve unit the respective specifically determined referencing bias is compared with the electric bias sensed during the test operation.

In order to mention only some examples (which are not intended to limit the invention) the extent of the clogging might be determined from an absolute or relative comparison of the maxima of the referencing bias and the bias determined during the testing operation and/or a comparison of the occurrence in time of the maxima of the referencing bias and the bias determined during the testing operation and/or the area of the difference of the curves of the referencing bias and the bias determined during the testing operation over the time.

It is possible that for a given extent of the clogging of the agricultural sprayer valve unit the electric bias is independent on the pressure in the primary line or there is only a tolerable pressure dependency. When this is not the case the invention proposes that a referencing operation for one agricultural sprayer valve unit is executed for different pressures in the primary line. In this case then a plurality of pressure-dependent referencing biases can be stored. An extent of a clogging of the agricultural sprayer valve unit, of the secondary line and/or an output nozzle can in this case be determined by a comparison of the referencing bias for the pressure which biases the primary line in the testing operation with the electric bias sensed during the testing operation. In this way, it is possible to further increase the precision and the reliability of the determination of the extent of a clogging.

Another embodiment of the invention aims for the reduction of the power consumption of the agricultural sprayer valve unit: Whereas it is generally assumed that a permanent energization of the holding magnet with a sufficient holding current is required for maintaining the closed position of the holding magnet, the invention proposes that by means of a control logic of a control unit the electric bias (in particular the voltage applied to the holding magnet) is varied in the closed position of the control valve in an oscillating fashion between a minimum and a maximum. Here, any oscillating curve of the electric bias between the maximum and the minimum is possible. Preferably an oscillating square or rectangular voltage oscillating between a maximum and a minimum of zero is applied to the holding magnet. It has surprisingly shown that despite of a temporary reduction of the electric bias from the maximum to the minimum the holding magnet and therewith the agricultural sprayer valve unit maintains its closed position. The following effects (which are not intended to limit the invention) might be responsible for such behavior:

a) It is possible that the inertia of the holding magnet and of the components moved therewith, the resisting forces due to friction when moving the holding magnet and/or forces applied by the pressure might have the result that (despite of the reduction of the holding current) the holding magnet initiates to move sufficiently slowly such that until the recovery of the holding current the holding magnet has only made a sufficiently small displacement. Accordingly, the holding magnet can again be directly returned into the closed position and on the other hand the very small movement of the holding magnet and of the control valve valve body moved therewith is sufficiently small so that there is no opening of the control valve (e. g. due to the sealing effect of the elastic sealing which can still be provided for small opening movements).

b) It is also possible that the reduction of the holding current in the coil of the holding magnet induces a counteracting field which in the end leads to the result that despite of the reduction of the holding voltage to a minimum or even to zero the holding current is still upheld or only reduced to a small extent such that the holding force is still sufficient for holding the holding magnet in the closed position.

It is required to adapt the frequency of the oscillating electric bias to the above-mentioned effects. It is e. g. possible that the frequency of the oscillation of the electric bias is chosen in the region of 100 to 500 Hz or 200 to 300 Hz.

Within the frame of the invention it is possible to process or analyze the curve of the current which biases the holding magnet. For a particular proposal of the invention the curve is used for determining the point in time when the closed position of the control valve is reached. This might on the one hand be important for the exact determination of the relationship of the opening times to the closing times of the control valve and/or for an exact control of the volumetric flow of the fluid. On the other hand, the point in time of the arrival in the closed position might also be used for adapting the current which biases the holding magnet, in particular with a reduction of the current which is sufficient for providing the holding effect because an air gap of the holding magnet has been closed. For an alternative or cumulative embodiment the determined point in time of arriving in the closed position can be used for triggering the aforementioned oscillating electric bias. According to the inventive proposal the point in time of the arrival in the closed position of the control valve is determined from the curve of the current by which the holding magnet is biased. Here, a reduction of the current to or below a threshold is detected which correlates with the current which is reached when reaching the closed position (in some cases after an increase of the current up to a maximum for accelerating the holding magnet from the open position, the arrival at a maximum of the current and then subsequently a reduction of the current with a reduction of the gap of the holding magnet). For increasing the security of detecting the arrival in the closed position it can subsequently additionally be analyzed if an increase of the current is detected which is caused by the fact that the gap of the holding magnet has completely been closed. For an alternative or cumulative embodiment it is possible that for detecting the arrival of the closed position it is analyzed if there is a turning point or a discontinuity of the reducing current during the reduction of the current.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Figure 1:
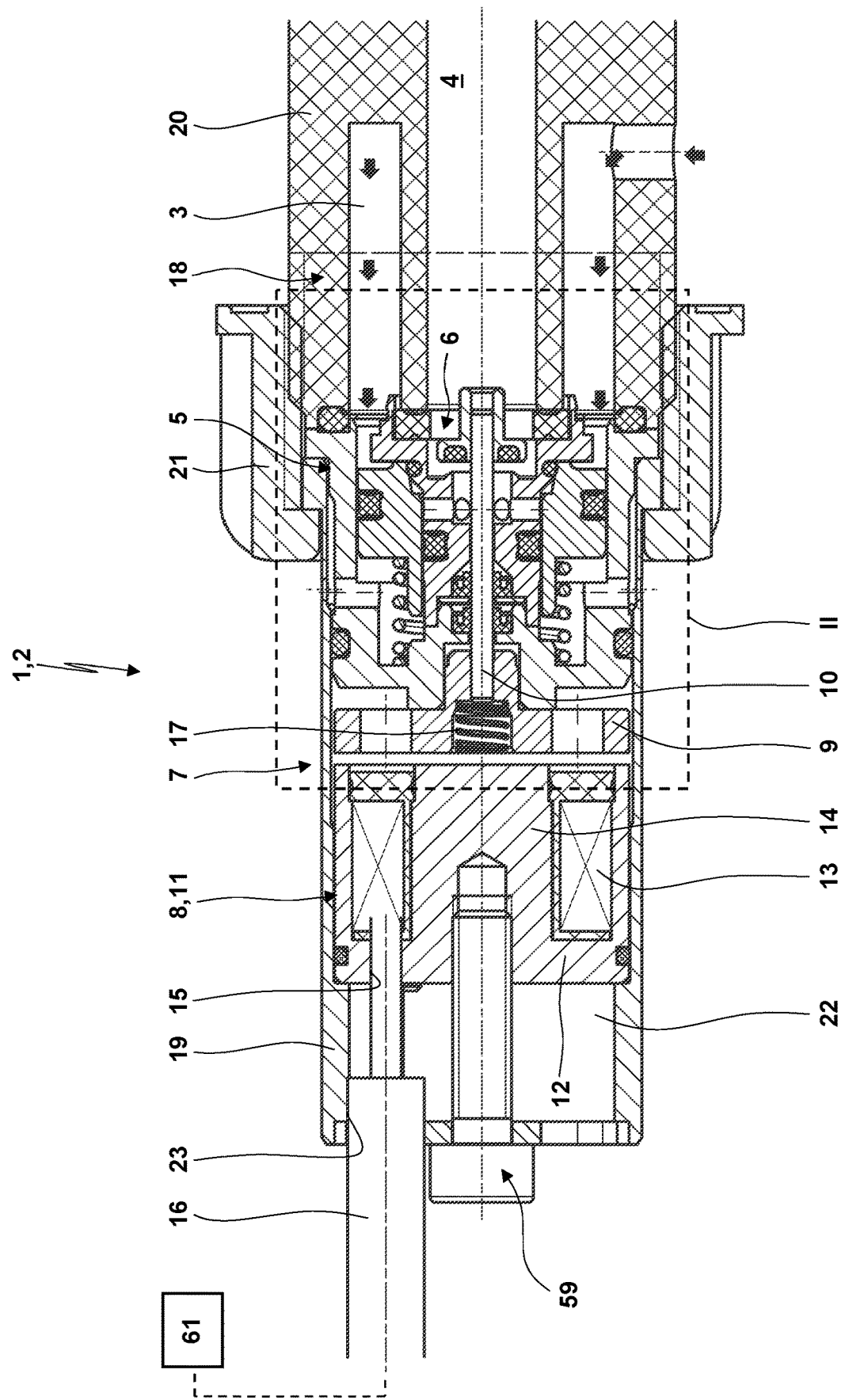
FIG. 1 in a longitudinal section shows an agricultural sprayer valve unit wherein an overflow valve is in a closed position whereas an electronically controlled control valve is in an open position.

FIG. 1 in a longitudinal sectional view shows an agricultural sprayer valve unit 1 which might constitute an agricultural sprayer valve device 2 or might be a component of the same.

The agricultural sprayer valve unit 1 comprises a port on the inlet side (not shown here) which leads to a primary line 3 and a port arranged on the outlet side (not being shown here) which leads to a secondary line 4. The primary line 3 is connected via an overflow valve 5 and an electronically controlled control valve 6 to the secondary line 4. Here, the primary line 3, the overflow valve 5, the control valve 6 and the secondary line 4 are arranged in a fluidic series connection in this order.

The electronic actuation of the control valve 6 is provided by an electric actuator 7 which comprises a holding magnet 8 for the shown embodiment. The holding magnet 8 biases an armature 9 which carries a valve stem 10. The holding magnet 8 is here embodied as a pot magnet 11. For that purpose, the holding magnet 8 comprises an accommodating body 12 which is electromagnetically effective and has the shape of a lying U in a semi-longitudinal section. A coil 13 of the holding magnet 8 is embedded between the two parallel legs of the lying U of the accommodating body 12. The coil 13 concentrically encloses the actuation axis of the holding magnet 8 having a horizontal orientation in FIG. 1. The inner leg of the lying U in the semi-longitudinal section forms a rigid core 14 being arranged within the coil 13. In the circumferential section the base leg of the lying U comprises a passage 15. It is possible to transfer an external electric biasing signal through the passage 15 to the coil 13 (e. g. by use of a cable or a plug 16). A spring is effective between the holding magnet 8 and the armature 9. The spring is here embodied as an opening spring 17. The spring biases the armature 9 away from the holding magnet 8. Differing from the representation in FIGS. 1 and 2 the opening spring 17 is also pre-tensioned in the shown open position so that the opening spring 17 with one spring base contacts the armature 9 and with the other spring base contacts the accommodating body 12 with a pre-tensioning force. Accordingly, due to the effect of the opening spring 17 the armature 9 is in its open position in the not energized state of the holding magnet 8. The control (covering both an open-loop control and a closed-loop control) of the electric bias of the coil 14 of the holding magnet 8 is provided by a control unit 61.

For the shown embodiment the agricultural sprayer valve unit 1 comprises a housing 18 with housing parts 19, 20 being connected to each other by a sleeve nut 21. The housing delimits an inner chamber 22 wherein in particular the components of the overflow valve 5, of the control valve 6 and of the actuator 7 are arranged.

The housing part 19 comprises a port or passage 23 for the plug or cable 16. Furthermore, the housing 18 forms the ports for the primary line 3 and the secondary line 4 or carries these ports. The holding magnet 8 is mounted by a mounting screw 59 to the housing 18.

Figure 2:
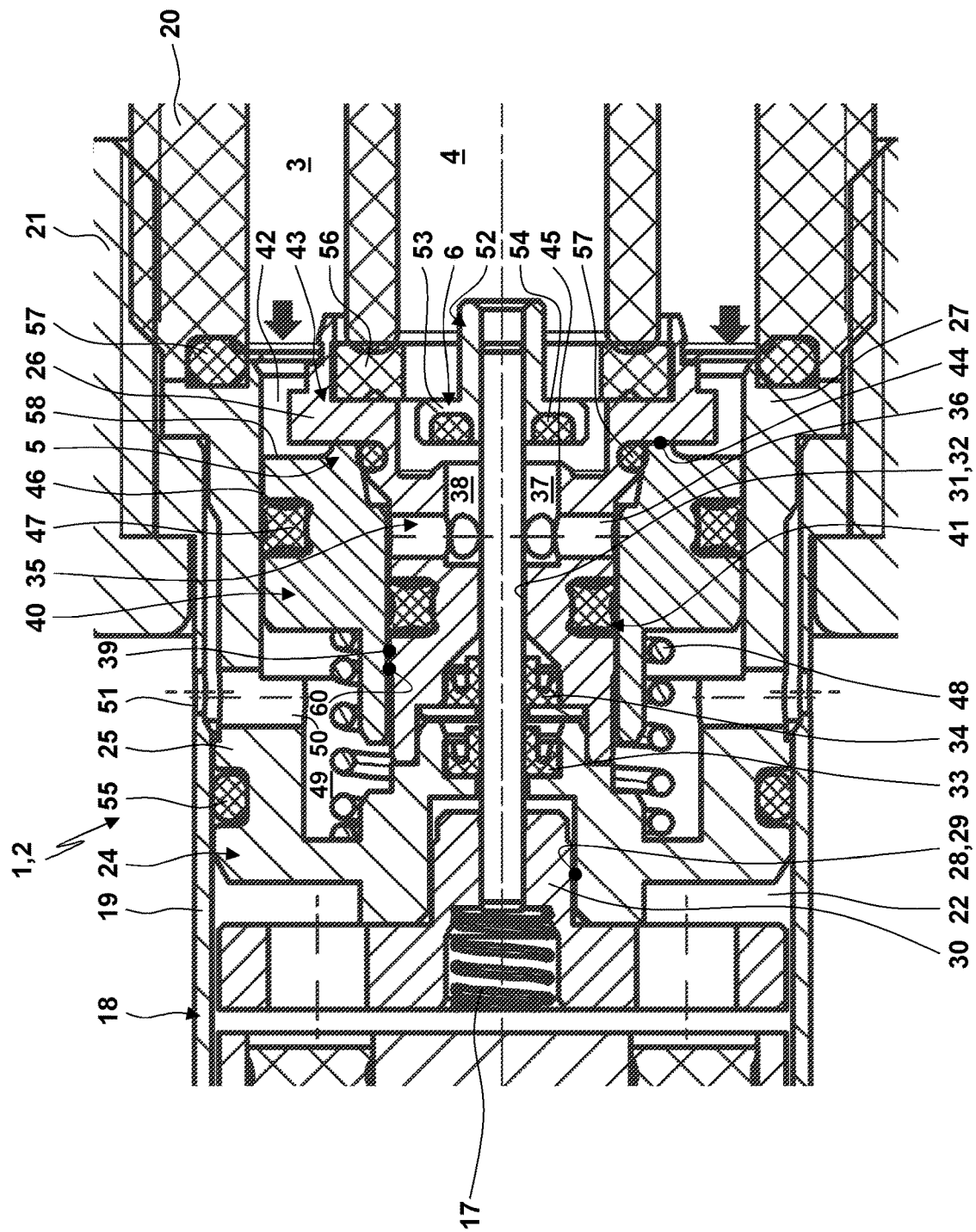
FIG. 2 shows a detail II of the agricultural sprayer valve unit of FIG. 1.
Figure 3:
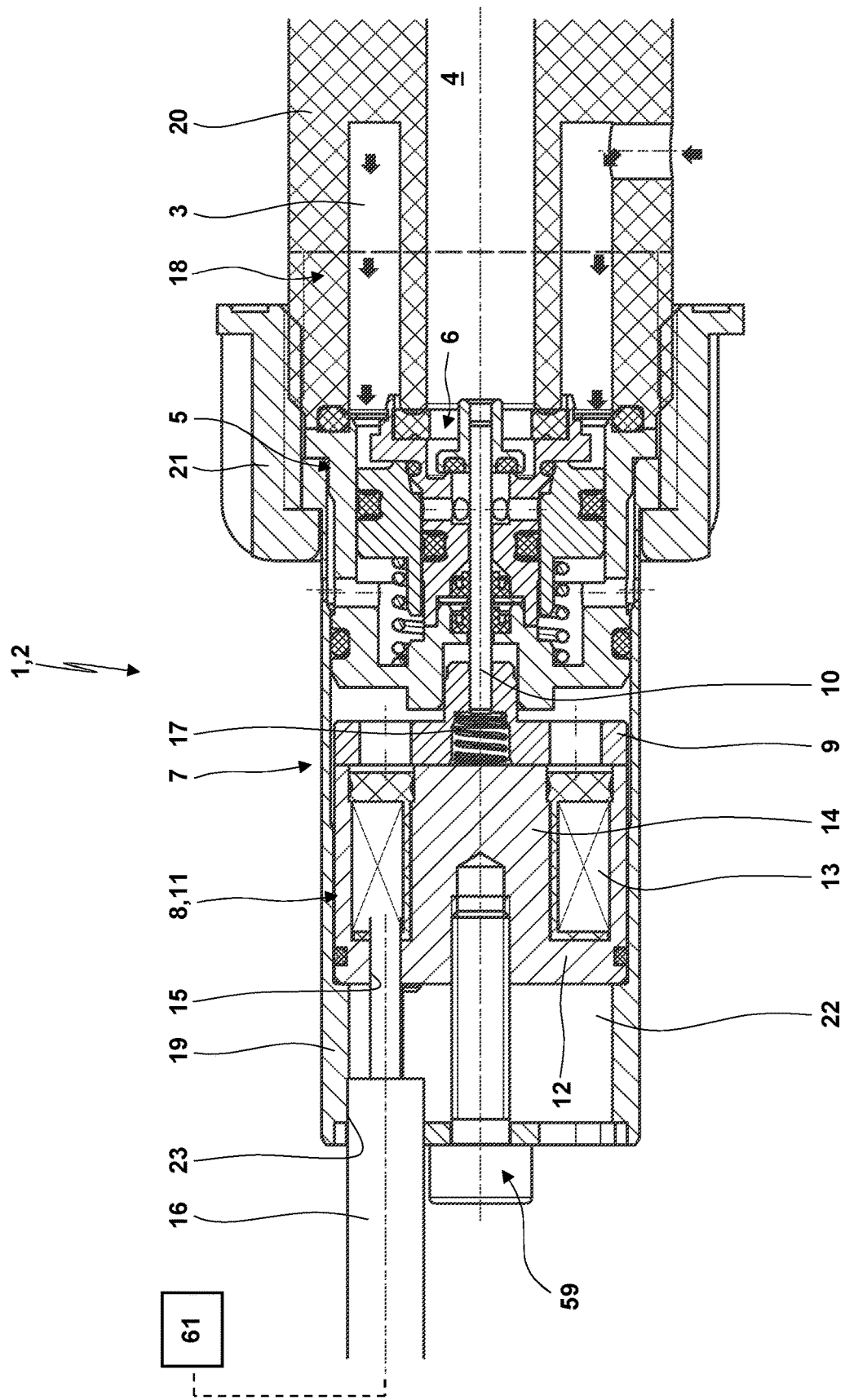
FIG. 3 in a longitudinal section shows the agricultural sprayer valve unit of FIGS. 1 and 2 where here both the electronically controlled control valve as well as the passive overflow valve are in their closed positions.

The further construction of the agricultural sprayer valve unit 1, in particular of the overflow valve 5, of the control valve 6 and the coupling of the control valve 6 to the actuator 7 is shown in detail II in FIG. 2.

A housing insert 24 is arranged in the inner chamber 22 of the housing 18. For assembly reasons the housing insert 24 is made of two parts being housing insert parts 25, 26. In the assembled state the housing insert 24 is fixedly held in the housing 18. For the shown embodiment this is provided by clamping a ring collar 27 (having an orientation in radial outer direction and being continuous in circumferential direction) by the sleeve nut 21 between the front faces of the housing parts 19, 20.

The housing insert 24 is used an a multifunctional way:

On the side facing towards the armature 9 the housing insert 24 forms a guidance 28 for the armature 9. For the shown embodiment for this purpose the housing insert 24 comprises a bore 29 wherein a cylindrical protrusion 30 of the armature 9 is guided.

A through bore 31 of the housing insert 24 extends from the bottom of the bore 29.

At least one guidance 32 for the valve stem 10 is arranged in the region of the through bore 31 and/or sealing elements 33, 34 between the housing insert 24 and the valve stem 10 are effective in the region of the through bore 31. For the shown embodiment one sealing element 33 is effective between the housing insert part 25 and the valve stem 10 whereas the other sealing elements 34 is effective between the housing insert part 26 and the valve stem 10.

On the side facing away from the armature 9 and facing towards the control valve 6 the housing insert 24 (here the housing insert part 26) forms and/or delimits at least one (streaming) channel 35 which allows a transfer of the fluid from the overflow valve 5 to the control valve 6. For the shown embodiment the channel 35 is formed by radial bores 36 and a ring chamber 37 into which the bores 36 open on the inner side in radial direction. Here, the ring chamber 37 is on the radial inner side delimited by the valve stem 10. The ring chamber 37 is on the radial outer side delimited by a stepped bore 38 into which the through bore 31 opens.

A cylindrical outer surface of the housing insert 24 (here of the housing insert part 26) forms a guidance 39 for an overflow valve valve body 40 in the region of a through recess 60 of the overflow valve valve body 40. In the region of the guidance 39 a sealing element 41 is effective between the housing insert part 26 and the through recess 60, the sealing element 41 here being arranged in a circumferential groove of the housing insert part 26.

The housing insert part 25 forms a valve seat body 43 (at a location arranged radially inside from the ring collar 27). On the side facing towards the armature 9 the valve seat body 43 forms an overflow valve valve seat 44. Furthermore, on the side facing away from the armature 9 (here at a location arranged radially inside from the overflow valve valve seat 44) the valve seat body 43 forms a control valve valve seat 45.

Also in the region of its cylindrical outer surface the overflow valve valve body 40 is guided by a guidance 46 (here a cylindrical inner surface of the housing insert part 25). Also here in the region of the guidance 46 there is a sealing by a sealing element 47 which is accommodated in a circumferential groove of the overflow valve valve body 40.

A spring base of a closing spring 48 is supported on the housing insert 24 (here the housing insert part 25). The closing spring 48 is pre-tensioned between the housing insert part 25 and the overflow valve valve body 40. Due to its pre-tension the closing spring 48 presses the overflow valve valve body 40 against the overflow valve valve seat 44.

A ring chamber 49 arranged between the overflow valve valve body 40 and the housing insert part 25 (the axial extent of the ring chamber 49 changing with a movement of the overflow valve valve body 40 and the closing spring 48 being arranged within the ring chamber 49) is pre-pressurized by a radial bore 50 of the housing insert part 25 and a bore 51 connected thereto.

The aforementioned designs and functions are only optional and might be provided alternatively or cumulatively.

In the end portion facing away from the armature 9 and protruding from the housing insert 24 the valve stem 10 carries a control valve valve body 52 which forms an angular valve disc 53. In the contact region of the valve disc 53 and the control valve valve seat 45 the control valve valve body 52 comprises a sealing element which is here at least partially embedded into an axial groove of the valve disc 53 being continuous in circumferential direction.

Further sealing elements 55, 56, 57 provide in a way evident for the skilled person that fluid is able to be transferred from the primary line 3 with the ring channel 42 only via the overflow valve 5, the channel 55 and the control valve 6 to the secondary line 4 without any leakage.

The function of the agricultural sprayer valve unit 1 is as follows:

a) In the beginning, according to FIG. 1 the coil 13 of the holding magnet 8 is not energized and no fluidic pressure biases the primary line 3. Accordingly, the closing spring 48 presses the overflow valve valve body 40 against the overflow valve valve seat 44 so that the overflow valve 5 is in its closed position. It is possible that in the closed position of the overflow valve 5 a sealing element 57 is effective between the overflow valve valve seat 44 and the overflow valve valve body 40. Due to the effect of the opening spring 17 the armature 9, the valve stem 10 and the control valve valve body 52 are in the open positions so that the control valve 6 is in its open position.

b) When pressurizing the primary line 3 with a pressure (e. g. by the start of the supply operation of a circuit for a supply of the agricultural sprayer valve unit 1 or with an opening of a valve arranged upstream), the pressure being smaller than an opening pressure of the overflow valve 5, the pressure biases a ring surface 58 which is arranged outside from the sealed contact between the overflow valve valve body 40 and the overflow valve valve seat 44. The pressure force generated by the ring surface 58 is smaller than the force of the closing spring 48 so that the closed position of the overflow valve 5 is maintained. Despite of the control valve 6 being in the open position the fluid is not able to pass through the agricultural sprayer valve unit 1 and there is in particular no dripping of the fluid. By the dimension of the area of the ring surface 58, by the dimension of the pre-tensioning displacement of the closing spring 48 and by the choice of the spring stiffness of the closing spring 48 it is possible to define the opening pressure of the overflow valve 5 by constructive measures.

If the pressure of the fluid in the primary line 3 exceeds the opening pressure of the overflow valve 5, the pressure force caused by the fluid on the ring surface 58 exceeds the closing force of the closing spring 48 which causes a movement of the overflow valve valve body 40 away from the overflow valve valve seat 44 so that a transfer cross section is established between the overflow valve valve body 40 and the overflow valve valve seat 44. With the establishment of the transfer cross section the pressure in the primary line is not only applied to the ring surface 58 but to the whole front surface of the overflow valve valve body 40 (namely the ring surface between the two sealing elements 41, 47). Accordingly, the small initial opening of the overflow valve 5 leads to an increase of the opening force of the overflow valve 5. Fluid is then able to be transferred from the primary line 3 via the overflow valve 5 and the channel 35 to the control valve 6. There is a pressure compensation between the primary line 3 and the secondary line 4 which allows a reduction of the opening force of the overflow valve 5. Due to the increase of the area which is biased by the pressure reducing with the opening of the overflow valve 5 it is nevertheless possible to maintain the open position of the overflow valve 5.

Figure 4:
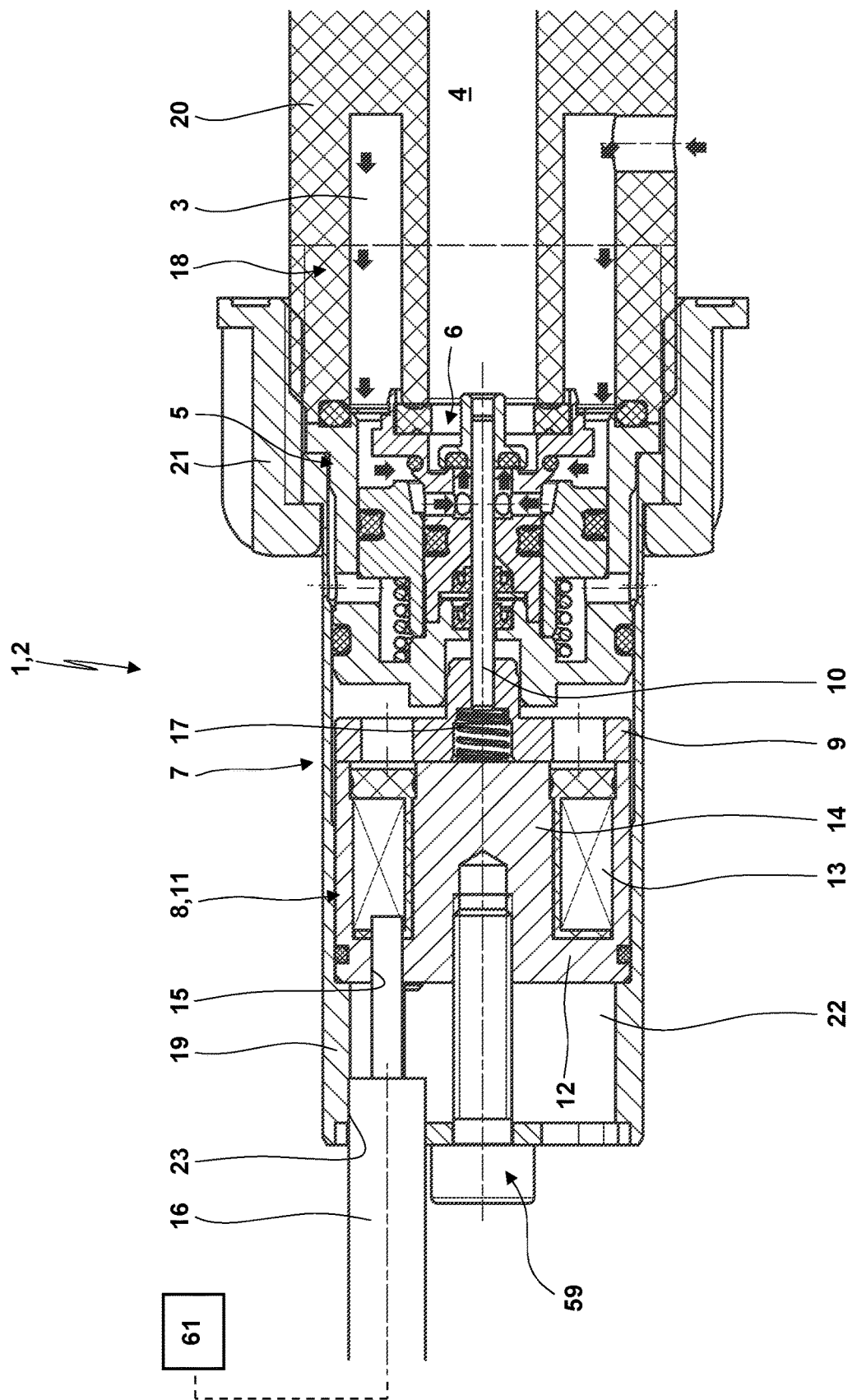
FIG. 4 in a longitudinal section shows the agricultural sprayer valve unit of FIGS. 1 to 3 where here the overflow valve is in its open position whereas the electronically controlled control valve is in its closed position.
Figure 5:
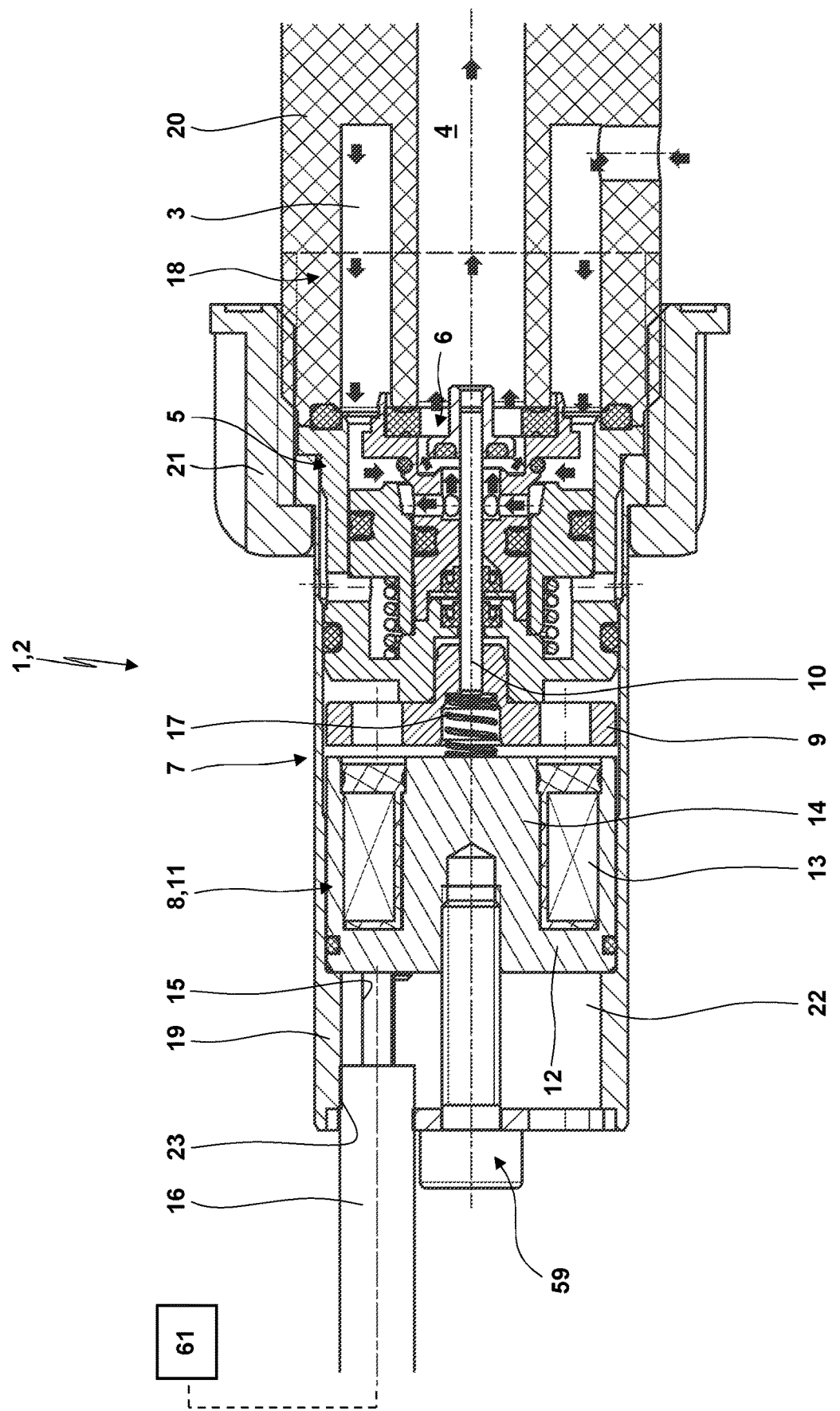
FIG. 5 in a longitudinal view shows the agricultural sprayer valve unit of FIGS. 1 to 4 where here both the overflow valve as well as the electronically controlled control valve are in their open positions.

If in the beginning the holding magnet 8 is not energized the control valve 6 is in its open position due to the effect of the opening spring 17. In the opened position a transfer cross section is established between the control valve valve body 52 and the control valve valve seat 45. The fluid is able to be transferred via the transfer cross section to the secondary line 4 (FIG. 5).

d) By means of an energization of the coil 13 it is possible to induce that the holding magnet 8 moves the armature 9 into the closed position. For inducing the closing movement in some cases only a very short impulse of the current is required. When the armature 9 contacts the holding magnet in some cases only a holding current is required for maintaining the closed position which is by a factor of at least 5, of at least 10 or even at least 20 smaller than the maximum current during the impulse of the current for inducing the closing movement. In the closed position (FIG. 4) the control valve valve body 52 contacts the control valve valve seat 45 with the provision of a sealing effect. Accordingly, despite of the pressure biasing the primary line 3 and despite of an in some cases open position of the overflow valve 5 a flow though the agricultural sprayer valve unit 1 is prevented and in particular a dripping is prevented.

Due to the fact that with the electric energization of the holding magnet 8 the control valve 6 takes the closed position and without an electric energization of the holding magnet 8 the control valve 6 takes the open position it is possible to control the output of the fluid by the electric energization. It is also possible that by means of a pulse-width modulation (in particular the choice of the Duty-Cycle parameters) it is possible to control the flow rate.

e) If instead the pressure in the primary line 3 decreases so that the pressure becomes smaller than the closing pressure (which is in some cases smaller than the opening pressure of the overflow valve 5) the overflow valve 5 automatically returns into the closed position so that independent on the operating position of the control valve 6 the flow is stopped.

Figure 6:
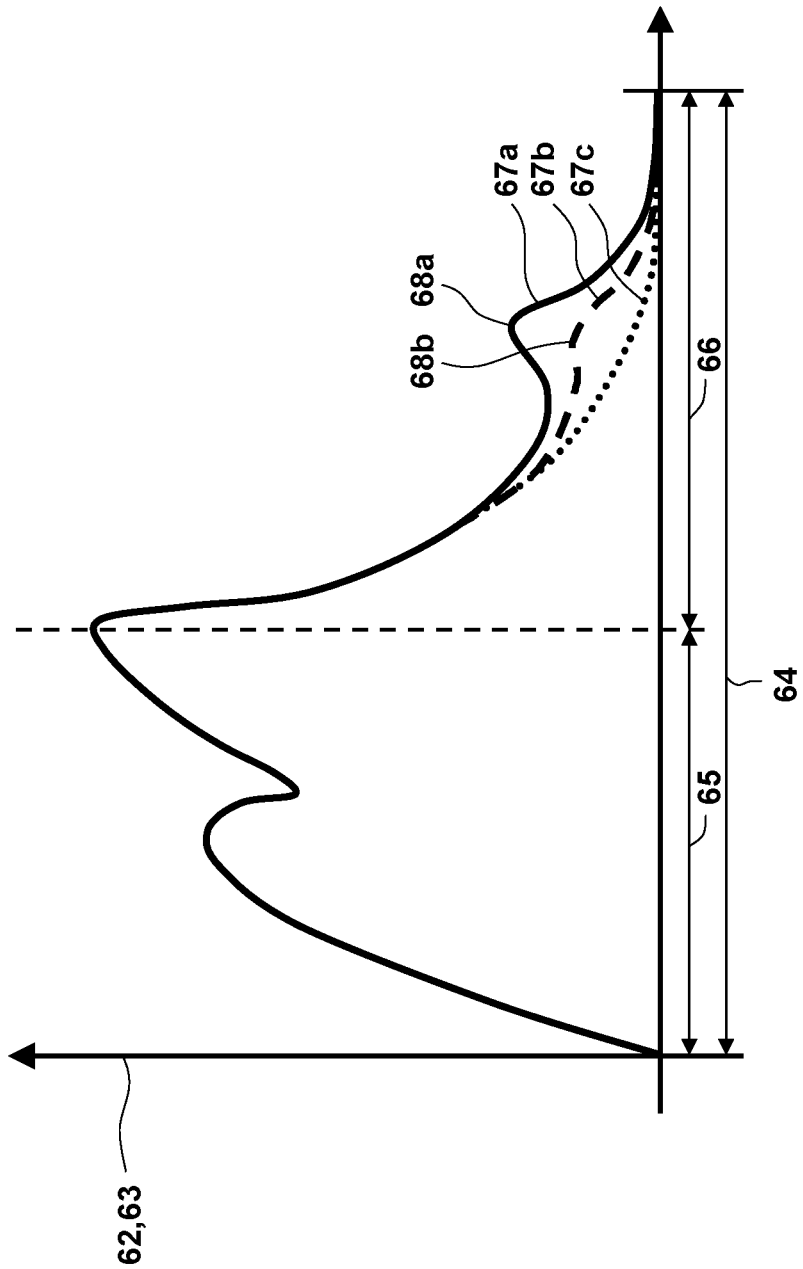
FIG. 6 schematically shows the curve of an electric bias of a holding magnet of an agricultural sprayer valve unit during one period of the pulse-width modulation where a solid line shows the curve without any clogging, the dashed line shows the curve for a clogging with a small extent and the dotted line shows the curve with a high extent of the clogging.

FIG. 6 shows an electric bias 62, here a current 63, which biases the coil 13 of the holding magnet 8 during one periodic time 64 of the pulse-width modulation. The periodic time 64 is divided into an ON-phase 65 (wherein the control unit 61 applies the required electric bias 62 on the coil 13) and an OFF-phase 66 (wherein the electric energization of the coil 13 is removed by the control unit 61). The ratio of the duration of the ON-phase 65 to the periodic time 64 (which is between 0 and 1) is also denoted as the duty factor. For the shown embodiment the duty factor is approximately 0.45. The changing flux between the armature 9 and the holding magnet 8 and the resulting magnetic induction in the coil 13 during the ON-phase 65 and the OFF-phase 66 lead to the curve 67 of the current 63 shown in FIG. 6. Here, the curve 67a shows the curve of the current 63 without a clogging when outputting the fluid, the curve 67b shows the curve of the current 63 when outputting the fluid with a small clogging and the curve 67c shows the current 63 when outputting the fluid with a larger or complete clogging.

In FIG. 6 it can be seen that the curve during the OFF-phase 66 significantly changes dependent on the extent of the clogging. So, the curves 67a, 67b for a non-complete clogging comprise a turning point whereas the curve 67c for the complete clogging does not have a turning point. The curve 67a comprises a more distinct maximum 68a than the maximum 68b of the curve 67b whereas the curve 67c does not have any maximum. Accordingly, from the analysis of the curves 67 it is possible to analyze if there is a clogging or not. It is even possible that (e. g. under the consideration of the absolute value of the maximums 68a, 68b) the extent of the clogging (or a flow rate) is determined and a characteristic parameter correlating therewith is determined.

Preferably, the opening pressure of the overflow valve 5 is above 0.5 bar, 0.8 bar, 1.0 bar or 1.2 bar. It is e. g. possible that the opening pressure of the overflow valve 5 is in the region of 0.5 bar to 2.0 bar, 0.8 bar to 1.5 bar or 1.0 bar to 1.4 bar.

Preferably, the agricultural sprayer valve unit 1 is operated in a way such that the control valve 6 is not opened to a larger or smaller extent dependent on the energizing current. Instead, the actuator 7 is electrically biased in a way such that only a completely opened position and a completely closed position is taken (with the opening and closing movements between the open position and the closed position related therewith). It is possible that there is a permanent control into the opened position and/or the closed position. However, it is also possible that a pulse-width modulation with an induced change between the open position and the closed position is used. Here, in particular a pulse-width modulation with a frequency of 25 Hz is used. Preferably, the opening of the control valve 6 is pressure-supported by the fluid so that there is a fast opening movement. Here benefit is taken from the fact that in the closed position of the control valve 6 a back-pressure establishes on the inlet side of the control valve 6, the back-pressure being higher than the pressure on the outlet side which leads to a force acting in opening direction. Instead, the closing movement is generally induced against the pressure of the fluid. However, it is possible that the pressure difference between the inlet side and the outlet side is at least reduced in the open position due to the pressure compensation allowed in the open position so that a force induced by the pressure of the fluid opposing the closing movement is at least reduced.

It is possible that for detecting if the agricultural sprayer valve unit 1 operates according to the specifications and in particular that there is no clogging of the agricultural sprayer valve unit 1 a specific testing operation of the actuator 17 is used. It is e. g. possible to specifically control an opening of the agricultural sprayer valve unit 1 and subsequently close the agricultural sprayer valve unit 1, where then the currents and voltages can be considered for an analysis, in particular for detecting a possible clogging.

Figure 7:
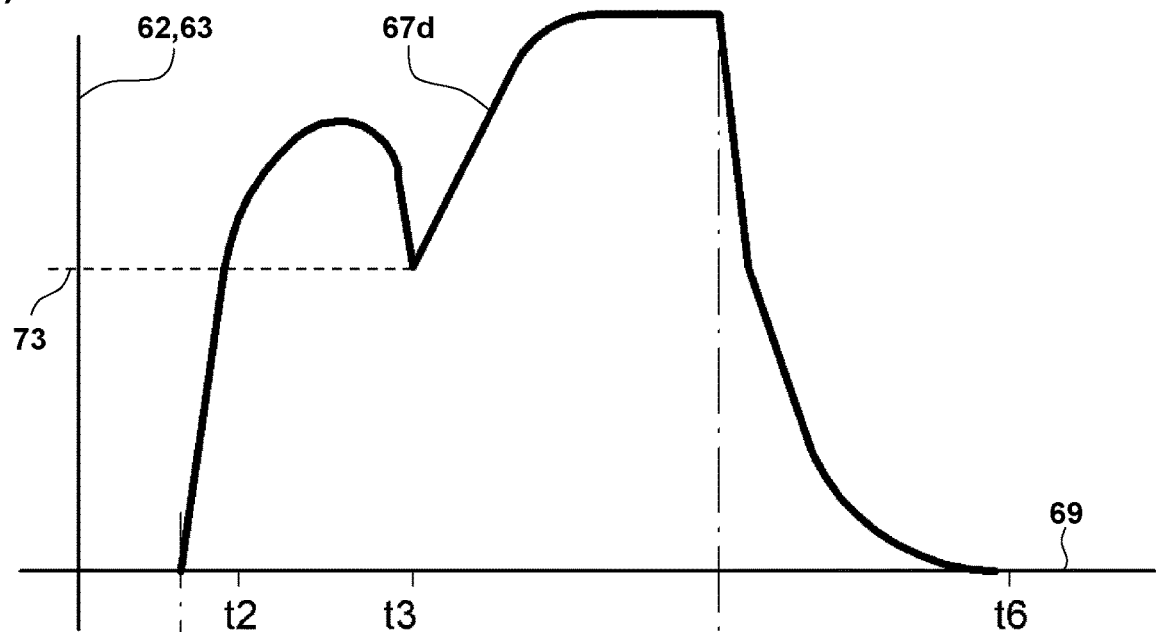
FIG. 7 schematically shows the curve of an electric bias of a holding magnet of an agricultural sprayer valve unit during the closure of the control valve from an open position and for the subsequent reopening of the control valve where a) shows the curve of the current biasing the holding magnet and b) shows the curve of the voltage biasing the holding magnet.
Figure 7:
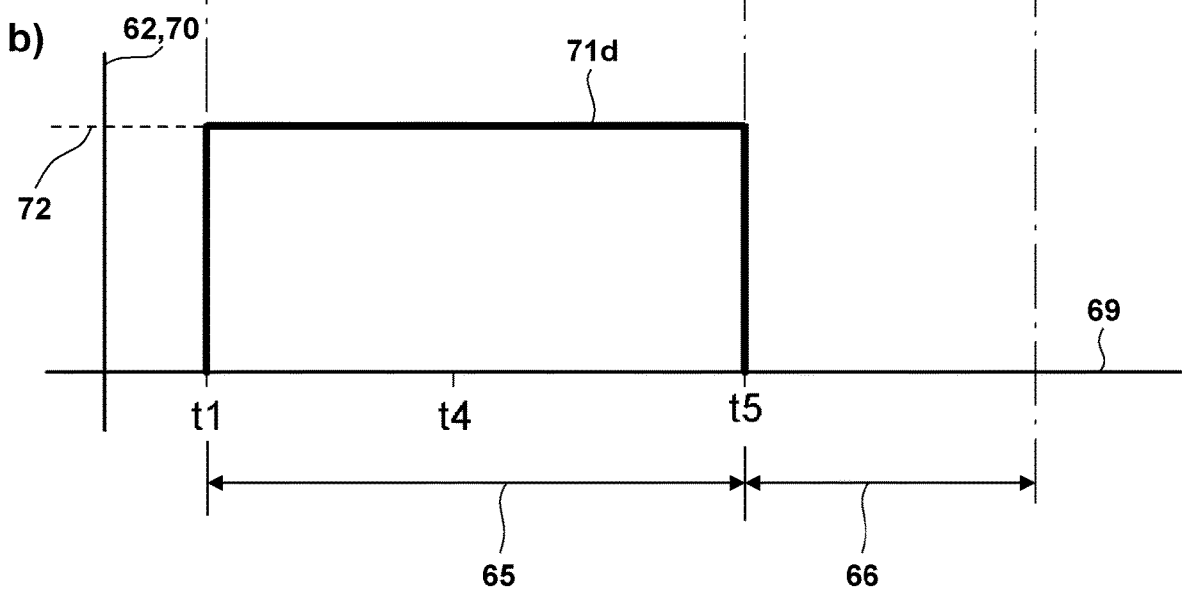
Figure 8:
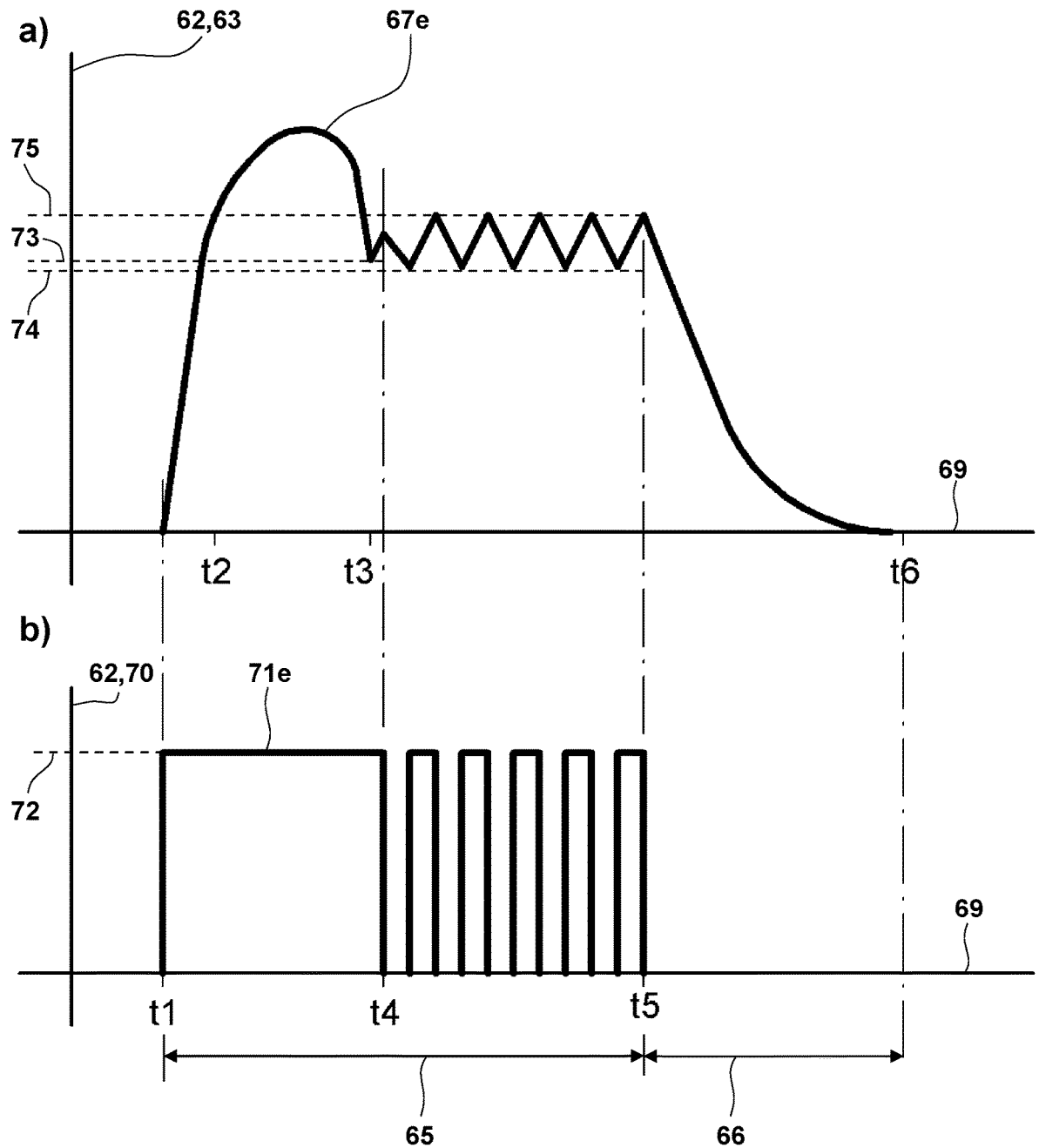
FIG. 8 schematically shows the curve of an electric bias of a holding magnet of an agricultural sprayer valve unit during the closure of the control valve from an open position and the subsequent reopening of the control valve where a) shows the curve of the current biasing the holding magnet and b) shows the curve of the voltage biasing the holding magnet, where in the closed position of the control valve the holding magnet is biased by a voltage oscillating between a minimum and a maximum.
Figure 9:
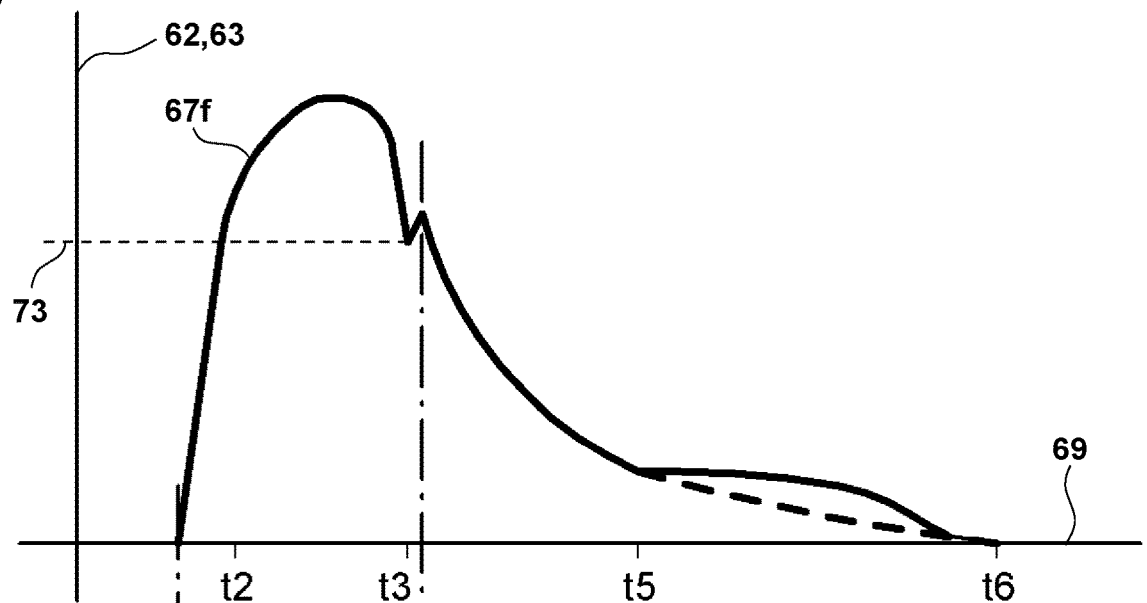
FIG. 9 schematically shows the curve of an electric bias of a holding magnet of an agricultural sprayer valve unit during the closure of the control valve from an open position and the subsequent reopening of the control valve where a) shows the curve of the current biasing the holding magnet and b) shows the curve of the voltage biasing the holding magnet, where the curves are considered as testing signals for determining an extent of a clogging and the solid line shows the curve of the current for a control valve not being clogged or being clogged with a small extent whereas the dashed line shows the curve of the current for a clogged control valve.
Figure 9:
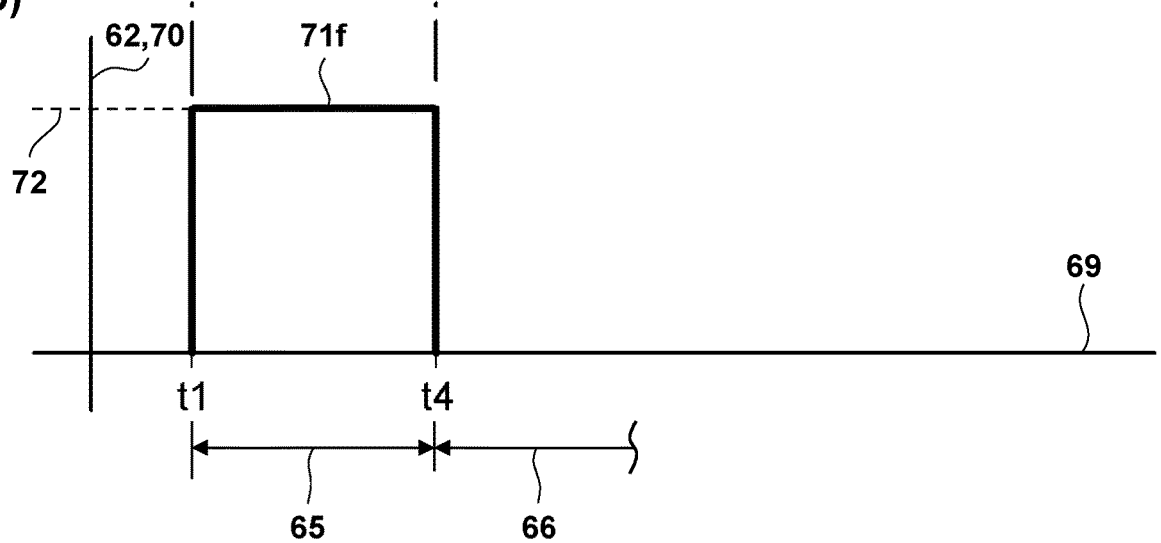

FIGS. 7 to 9 under a) show the curve 67 of the electric bias 62 being the current 63 over the time 69 whereas b) shows the curve 71 of the electric bias 62 being the voltage 70 over the time 69.

The curves 67, 71 between the points in time t1 and t6 shown in FIGS. 7 to 9 are related to the generation of a holding voltage 72 for a closure of the holding magnet 8 at a point in time t1 from an open position of the holding magnet 8, for the reduction of the air gap of the holding magnet 8 starting at a point in time t2, the arrival at the closed position at a point in time t3, the detection that the closed position has been reached at a point in time t4, the reduction of the voltage 70 to 0 at a point in time t5 for again opening the holding magnet 8 and the arrival at the open position and in some cases also the maintenance of the open position up to a point in time t6. Here, the shown curves between the points in time t1 and t6 e. g. apply during a pulse-width modulation so that again a new sequence corresponding to the shown curve between the points in time t1 and t6 directly follows to the point in time t6. The duty cycle is defined by the point in time t5. However, it is also possible that prior to the point in time t1 and/or subsequent to the point in time t6 the holding magnet 8 and the control valve 6 remain in the open position so that an individual control for inducing the closed position and also an individual dimensioning the time span of the maintenance of the closed position is possible. It is e. g. possible that after the curves shown in FIGS. 7 to 9 there is a temporary closure of the holding magnet 8 and the control valve 6 for testing purposes. The temporary closure can be induced only once or can be repeated or can be repeated on a rotational basis in order to e. g. detect a clogging of the control valve (and/or of the streaming cross sections arranged upstream and/or downstream).

FIG. 7 shows the increase of the current 63 from 0 at the point in time t1. Whereas initially the current 63 increases linearly, the reduction of the gap leads to a decrease of the slope of the increase of the current until a maximum is reached. Subsequently the current 63 decreases when approaching the closed position until at the point in time t3 a threshold 73 of the current 63 is reached. Due to the fact that starting with the point in time t3 the gap of holding magnet 8 is closed, subsequently the curve 67d of the current 63 again linearly increases up to an asymptotical arrival at a saturation value. If at the point in time t5 the voltage 70 is again reduced to 0 for inducing the open position of the control valve 6, in the beginning the curve 67d of the current 63 linearly decreases. With the initiation of the movement of the holding magnet 8 the slope of the decrease of the current 63 slightly changes and then asymptotically approaches a zero current.

FIG. 8 shows that in the time interval between t3 and t5 the closed position of the holding magnet 8 and so of the control valve 6 can also be maintained if differing from FIG. 7 in this time interval the voltage 70 is not held at the holding voltage 72, but the voltage 70 oscillates with a constant frequency forth and back between a holding voltage 72 being a maximum and a voltage of zero being a minimum leading to the rectangular signal or square signal shown in FIG. 8b in the time span between t4 and t5.

At first the control logic of the control unit detects at a point in time t4 that the holding magnet 8 and the control valve 6 have arrived in the closed position. In the ideal case t4 is identical to t3. However, for the analysis and the signal processing by the control unit in some cases also a short time span between t3 and t4 might be required. If at the point in time t4 it is detected that the closed position has been reached, the control logic of the control unit triggers the oscillating switching of the voltage 70 forth and back. The reduction of the voltage 70 to zero does not directly lead to a reduction of the current 63 according to the curve 67e. Instead, the current 63 reduces with a comparatively small slope. The reason for this is the counter-field induced in the coil 13 with the core 14 of the holding magnet 8. Here, the frequency of the oscillating switching of the voltage 70 forth and back is chosen such that the slope of the current 63 due to the switching duration of the voltage resulting from the electromagnetic parameters of the holding magnets 8 leads to the result that the current 63 is only reduced to a minimum current 74 and not below the same. This minimum current 74 is (just) sufficient for holding the holding magnet 8 and the control valve 6 in the closed position. The generation of the holding voltage 72 in time when reaching the minimum current 74 leads to the result that corresponding to the curve 67e the current 63 again increases. This increase then continuous up to a maximum current 75. With the arrival at the maximum current 75 then the voltage 70 again decreases to zero according to the curve 71e and the process might then repeat for a number of times. The method used in FIG. 8 for reducing the voltage 70 in an oscillating fashion leads to a reduction of the electric power consumption of the control valve 6 in the closed position of the same.

FIG. 9 shows the generation of a testing signal in order to determine if the control valve 6 (and/or an output nozzle or a secondary line) is clogged. For that purpose at the point in time t1 the voltage 70 is increased (as explained above) to the holding voltage 72. Up to the point in time t4 the curve 67f of the current 63 corresponds to the curve 67e of the current 63 of FIG. 8 and the curve 71f of the voltage 70 corresponds to the curve 71e of the voltage 70 of FIG. 8. However, if at the point in time t4 it is detected that the closed position of the holding magnet 8 and of the control valve 6 has been reached (or has been maintained during the time span between t3 and t4) at once the voltage 70 is again reduced to zero according to the curve 71f so that immediately again the open position is induced and the closed position of the control valve 6 is upheld as short as possible. In the theoretical ideal case the gap of the holding magnet 8 is closed for a zero time span so that it is nearly continuously possible to output fluid from the control valve 6. A testing signal generated in this way aims for the evaluation of the curve 67f of the current 63 after the point in time t4. As described above for the embodiment of FIG. 6 for the curve 67f shown with solid line there is a turning point of the curve 67f and/or a maximum when the control valve 6 is not or only to a small extent clogged whereas for the dashed curve 67f there is no longer this turning point or the maximum. The absolute value of the maximum and/or the extent of a turning point can so be analyzed for detecting if there is a clogging.

A testing signal of FIG. 9 can be generated rotationally or only temporarily only for this test purpose. However, it is also possible that the curves 67f, 71f shown in FIG. 9 between the points in time t1 and t6 are a component of a pulse-width modulated signal so that a signal can be used for the analysis which is in any case provided due to the pulse-width modulation and which does not require an additional, per se not required closure of the control valve 6 for monitoring the clogging.

For the generation of the testing signal preferably the time span of the closure t1 to t3 respectively t1 to t4 is chosen as short as possible where the time span is preferably smaller than 100 msec, smaller than 50 msec or even smaller than 45 msec.

Many variations and modifications may be made to the preferred embodiments of the invention without departing substantially from the spirit and principles of the invention. All such modifications and variations are intended to be included herein within the scope of the present invention, as defined by the following claims.

I claim:

1. An agricultural sprayer valve unit comprising
a primary line,
a secondary line,
a control valve which is electronically controlled, arranged between the primary line and the secondary line and comprises a holding magnet designed and configured for maintaining and/or changing a valve positon of the control valve and
a passive overflow valve which is arranged between the primary line and the secondary line in a series connection with the control valve.

2. The agricultural sprayer valve unit of claim 1, wherein the control valve is in an open position when the holding magnet is not electrically biased.

3. The agricultural sprayer valve unit of claim 1, wherein a pressure in the primary line biases a smaller valve area in a closed position of the overflow valve than in an open position of the overflow valve.

4. The agricultural sprayer valve unit of claim 1, wherein
a) the control valve comprises a control valve valve body,
b) the overflow valve comprises an overflow valve valve body and
c) a common valve seat body forms both a control valve valve seat of the control valve which is contacted by the control valve valve body in a closed position of the control valve as well as an overflow valve valve seat of the overflow valve which is contacted by the overflow valve valve body in the closed positon of the overflow valve (5).

5. The agricultural sprayer valve unit of claim 1, wherein the overflow valve and the control valve are nested into each other in radial direction.

6. The agricultural sprayer valve unit of claim 1, wherein the overflow valve comprises an overflow valve valve body having a though recess, a channel between the overflow valve and the control valve and/or a component of the control valve at least partially extending through the through recess.

7. The agricultural sprayer valve unit of claim 1, wherein a housing with an inner chamber is provided,
a) an overflow valve valve body,
b) a control valve valve body and
c) at least one valve seat body which forms an overflow valve valve seat and/or a control valve valve seat,
being formed separately from the housing and being arranged in the inner chamber of the housing.

8. An agricultural sprayer valve device comprising an agricultural sprayer valve unit of claim 1, wherein a control unit is provided, the control unit comprising control logic which determines at least one parameter from an electric bias of the holding magnet, the parameter at least correlating with a flow rate and/or an extent of a clogging of
a) the agricultural sprayer valve unit,
b) the secondary line and/or
c) an outlet nozzle.

9. The agricultural sprayer valve device of claim 8, wherein the control logic biases the holding magnet with an electric bias with a pulse-width modulation and the parameter is determined on the basis of the electric bias.

10. The agricultural sprayer valve device of claim 9, wherein the control logic determines the parameter on the basis of the electric bias
a) during an OFF-phase of the pulse-width modulation or a closing movement of the control valve or
b) during an ON-phase of the pulse-width modulation or the opening movement of the control valve.

11. The agricultural sprayer valve device of claim 9, wherein the control logic is designed such that the parameter is determined from a local maximum of the electric bias
a) during an OFF-phase of the pulse-width modulation or a closing movement of the control valve or
b) during an ON-phase of the pulse-width modulation or an opening movement of the control valve.

12. The agricultural sprayer valve device of claim 9, wherein the control logic determines the parameter from plurality of cycles of the pulse-width modulation and a detected change of the parameter is considered as an indicator of a change of a flow rate and/or of an extent of a clogging.

13. The agricultural sprayer valve device of claim 8, wherein a plurality of agricultural sprayer valve units is provided which are each is associated with a respective output nozzle, the agricultural sprayer valve units with associated output nozzles being held by a spraying boom and being supplied by a pump with a fluid which is to be output, and at least one electronic control unit is provided which controls at least one of the agricultural sprayer valve units.

14. The agricultural sprayer valve device of claim 9, wherein a second control unit with control logic is provided or the control unit comprises control logic, the control logic a) controlling the control valve temporarily or repeatedly into a closed position during a permanent operation of the agricultural sprayer valve unit or for a test operation or a reference operation in an open position both of the control valve as well as of the passive overflow valve and b) determining the electric bias of the holding magnet which is then considered for the determination of a flow rate and/or an extent of a clogging of the agricultural sprayer valve unit, of the secondary line and/or of an output nozzle.

15. The agricultural sprayer valve device of claim 14, wherein the control unit or the second control unit controls a plurality of agricultural sprayer valve units and the control logic subsequently controls the control valves of the agricultural sprayer valve units into a closed position with an offset in time for testing or referencing.

16. The agricultural sprayer valve device of claim 8, wherein a second control unit with control logic is provided or the control unit comprises control logic, the control logic a) in a referencing operation controlling the control valve into a closed position, b) storing an electric bias of the holding magnet sensed during the referencing operation as a referencing bias, c) controlling the control valve into a closed position in a testing operation and d) determining an extent of a clogging of the agricultural sprayer valve unit, of the secondary line and/or of an output nozzle by a comparison of the referencing bias with an electric bias sensed during the testing operation.

17. The agricultural sprayer valve device of claim 16, wherein a plurality of referencing operation is executed for a plurality of different pressures in the primary line and a plurality of referencing biases is stored dependent on the pressure and an extent of a clogging of the agricultural sprayer valve unit, of the secondary line and/or of an output nozzle is determined by a comparison of the referencing bias for the pressure in the primary line during the referencing operation with the electric bias sensed during the testing operation.

18. The agricultural sprayer valve device of claim 8, wherein a second control unit with control logic is provided or the control unit comprises control logic, the control logic varying an electric bias of the holding magnet in a closed position of the control valve with an oscillation between a maximum and a minimum.

19. The agricultural sprayer valve device of claim 8, characterized in that a second control unit with control logic is provided or the control unit comprises control logic, the control logic a) monitoring a curve of a current biasing the holding magnet during a transfer of the control valve from an open position into a closed position and b) determining a point in time when the closed position of the control valve is reached from the curve of the current biasing the holding magnet by detecting a reduction of the current to or below a threshold and/or detecting a subsequent increase of the current and/or detecting a turning point of the reducing current and/or detecting a discontinuity of the reducing current.

* * * * *